US010085388B2

(12) United States Patent
Orridge

(10) Patent No.: US 10,085,388 B2
(45) Date of Patent: Oct. 2, 2018

(54) HURRICANE DISSIPATION SYSTEM AND METHOD

(71) Applicant: St. Jean Orridge, Cavello Bay (BM)

(72) Inventor: St. Jean Orridge, Cavello Bay (BM)

(*) Notice: Subject to any disclaimer, the term of this patent is extended or adjusted under 35 U.S.C. 154(b) by 0 days.

(21) Appl. No.: 15/458,834

(22) Filed: Mar. 14, 2017

(65) Prior Publication Data

US 2017/0181387 A1   Jun. 29, 2017

Related U.S. Application Data

(62) Division of application No. 12/833,899, filed on Jul. 9, 2010, now Pat. No. 9,624,917.

(51) Int. Cl.
*A01G 15/00* (2006.01)
*E01H 13/00* (2006.01)

(52) U.S. Cl.
CPC ................... *A01G 15/00* (2013.01)

(58) Field of Classification Search
CPC .............................. A01G 15/00; E01H 13/00
USPC .......................................................... 239/2.1
See application file for complete search history.

(56) References Cited

U.S. PATENT DOCUMENTS

| 4,311,012 A * | 1/1982 | Finley ................... A01K 61/00 60/641.7 |
| 7,520,237 B1 * | 4/2009 | Dimov Zhekov ...... B63B 39/10 114/264 |
| 7,832,657 B2 * | 11/2010 | Kitamura ............... A01G 15/00 114/264 |
| 2005/0133612 A1 * | 6/2005 | Uram ..................... A01G 15/00 239/2.1 |
| 2010/0155499 A1 * | 6/2010 | Gradle ................... A01G 15/00 239/14.1 |
| 2010/0224694 A1 * | 9/2010 | Wright, Sr. ............... F03D 9/28 239/2.1 |
| 2012/0024972 A1 * | 2/2012 | Ellis ...................... A01G 15/00 239/2.1 |

* cited by examiner

*Primary Examiner* — Justin Jonaitis
(74) *Attorney, Agent, or Firm* — Cionca IP Law P.C.; Marin Cionca

(57) ABSTRACT

A storm dissipation system having: means for moving water from a body of water located in the proximity of said storm, and means for mixing said water with the air for the purpose of changing the energy of said storm.

10 Claims, 9 Drawing Sheets

HURRICANE DISSIPATION SYSTEM AND METHOD

CROSS-REFERENCE TO RELATED APPLICATIONS

This application is a divisional application of and claims the benefit of U.S. Non-Provisional application Ser. No. 12/833,899, filed Jul. 9, 2010, which is hereby incorporated by reference, to the extent that it is not conflicting with the present application.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF INVENTION

1. Field of the Invention

The present invention relates generally to tropical storm and hurricane management and particularly to methods and systems for tropical storm and hurricane dissipation.

2. Description of the Related Art

Different entities have sought to mitigate or diminish hurricane intensity by bringing deeper colder oceanic water to the surface on a broad scale (for example along a whole coastline) on a long term basis, such as to permanently change the surface temperatures of the ocean along that coastline, thus making it inhospitable to hurricanes.

The present invention, of a hurricane dissipation system and method, is distinctly different from the above in that it targets individual storms that may pose a threat and dissipates them completely as specific and calculated dissipation actions.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

The present invention has as its objective the ability to dissipate a hurricane and/or tropical storm. It achieves this through the use of wind turbine pumps. The wind turbine pumps are powered by the winds of the storm itself, and spray a curtain of cold water high into the air. The cold water is drawn from below the storm, and is pumped rapidly to the surface and then sprayed or misted high into the air. This cold water absorbs the heat energy from the air and it is this heat energy which is the driving force behind any hurricane.

When the spray pumped into the air is misted into smaller droplets the surface area to volume ratio of the droplet is maximized and this in turn maximizes the rate of heat energy transfer between warm air and cold spray. In addition, the spray also acts as a brake on wind speeds (i.e. based on conservation of momentum principles wind travelling at a given speed that picks up a weight of spray must slow down). Hence, by using a series of these wind turbine pumps acting in cohesion, dissipation of a cyclonic storm may be achieved.

Using the teachings of the present invention, intensity manipulation of the storm can also be effected through the misting of spray, pumped up from different depths (and thus different temperatures) from beneath the wind turbine towers. Deeper colder water misted into the air will dramatically decrease storm intensity. Misting warmer surface waters into the air has the potential to increase storm intensity and this course of action might be pursued in order to grow the storm eye wall taller, which would allow any existing high and low atmospheric winds blowing in different directions to structurally tear the storm apart as an alternative means of dissipation.

When the objective is to anchor or steer the storm, ideally, the wind turbine pumps would be moved into the relatively low winds of the eye while the storm is in its tropical event stage for ease of insertion. By analogy, just as a bull may be easily led around by its nose ring, a hurricane may be most easily and economically 'led around' or anchored by its eye.

Studies show that as a hurricane intensifies, the eye size tends to contract down to between 5 and 15 miles. The average eye size for tropical events is said to be about 30 miles across. A spread of floating wind turbines that can introduce significant spray into the air such as to affect wind speeds over such an eye size range is a very feasible undertaking.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which.

DETAILED DESCRIPTION

Figure 1:
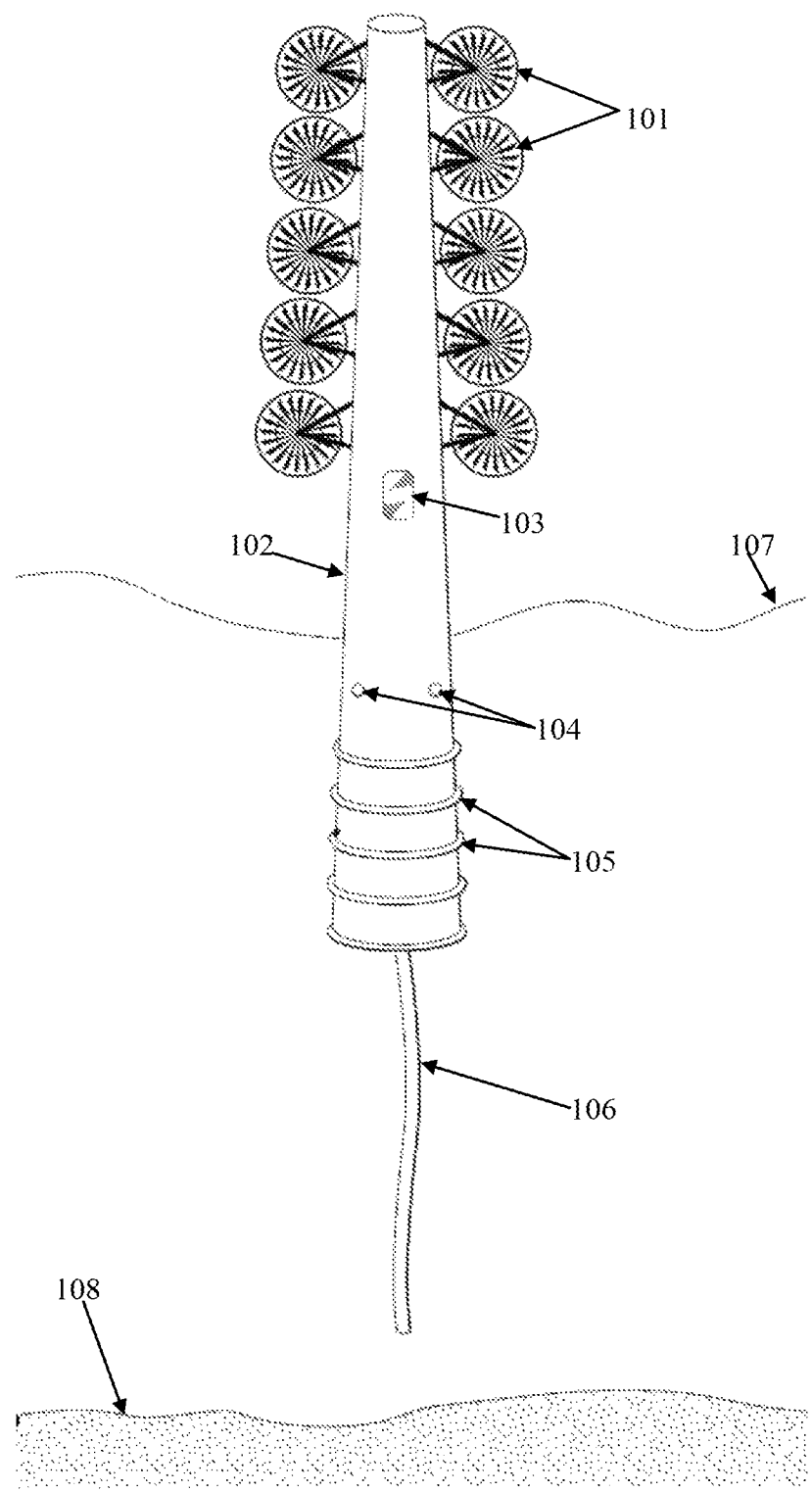
FIG. 1 illustrates the side view of a wind-turbine pump tower with wind-turbines 101, central tower housing generators, batteries and pumps 102, navigation window 103, propulsion jets 104, water filled tower base with baffles 105, weighted hose 106, the ocean surface 107 and ocean floor 108, in accordance with several embodiments of the present invention.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

The terms storm, hurricane, tropical storm, typhoon, cyclone, and any other such terms used herein to identify said events are to be taken as interchangeable and may be considered to be equivalent to any other similar term that might be used herein to describe any such similar event.

FIG. 1 illustrates the side view of a wind-turbine pump tower with wind-turbines 101, hollow central tower 102, navigation window 103, propulsion jets 104, water filled tower base with baffles 105, weighted hose 106, the ocean surface 107 and ocean floor 108, in accordance with several embodiments of the present invention. The design of the wind-turbines 101 is akin to that found in jet airplanes which can withstand extreme wind speeds. The purpose of the wind-turbines is to use the storm's own winds to power the pumps. It is recognized that the pumps may be propelled using other forms of energy, as for example, fossil fuels or even atomic energy; however using the energy from the storm's own winds is the preferred embodiment.

The hollow central tower 102 houses the pumps, generators, electric cables, etc. The pumps can be used to draw cold deeper water from below the storm and pump a curtain of cold water spray high into the air for the purpose of dissipating the storm. This cold spray draws the heat energy from the air, and it is this heat energy which is the driving force of a hurricane. The spray also acts as a brake on wind speed. In addition, the cold water spray may have the power to interrupt the vertical column of the eye of the hurricane, thus breaking up the symmetry of the storm, and hence the storm itself. Therefore, by using a series of these wind-turbine pump towers acting in cohesion, (e.g. as a cluster or array) dissipation of a tropical storm or hurricane may be achieved.

The pumps and the generators are aligned so that their axes of rotation are vertical to add gyroscopic stability to the central tower 102. The wind-turbine pump tower may be designed and constructed to be as tall as possible in order to maximize the time the spray is in the air and thus the time available for heat energy transfer. Each wind-turbine pump tower is designed to float in the water and is maneuvered with its own water jet propulsion system (akin to a jet ski), which may be powered using fossil fuels, electrical power generated by the storm's winds, a combination thereof, and/or any other readily available source of energy (e.g. battery power, atomic energy, etc). Using a portion of the energy from the wind-turbines 101, as the source of the wind-turbine pump tower's motive power, is preferred because it means that, once again, the storm's own winds can provide basically all the power necessary to control the storm itself.

The wind-turbine pump tower may be maneuvered using remote control technology, a set computer program, or it may be driven by a human driver. The navigation window 103 may be used by a camera or a man to help in the maneuvering and positioning of the tower into the desired location. More than one navigation window 103 would be installed, so that a complete field of view can be provided for. The base 105 of the wind-turbine pump tower uses pedestal technology from oil rig platforms: water filled base with baffles provides complete stability of the tower. The weighted hose 106 of the wind-turbine pump tower hangs down into cold deeper water which is rapidly pumped to the surface and sprayed high into the air in order to dissipate the storm.

Figure 2:
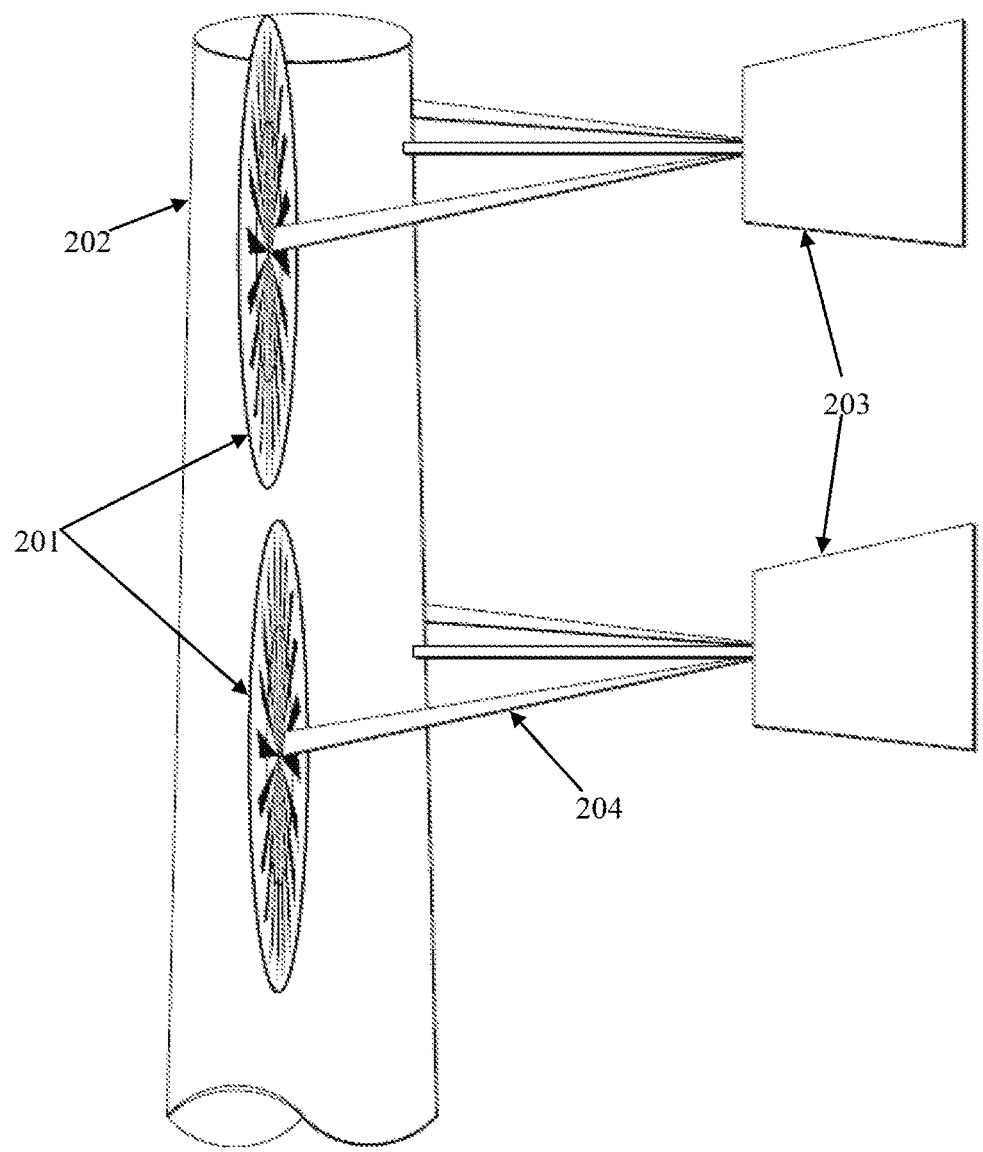
FIG. 2 illustrates a partial side view of a wind-turbine pump tower with wind-turbines 201, hollow central tower 202 which houses generators and pumps vertically aligned to enhance stability through their gyroscopic effect, tail blades 203 and wind-turbine supporting frame 204, in accordance with several embodiments of the present invention.

FIG. 2 illustrates a partial side view of a wind-turbine pump tower with wind-turbines 201, the hollow central tower 202, which houses pumps vertically aligned to enhance stability through their gyroscopic effect, tail blades 203 and wind-turbine supporting frame 204, in accordance with several embodiments of the present invention. Each wind-turbine pump tower has a plurality of wind-turbines 201, and each wind-turbine 201 has its own supporting frame 204 and tail blade 203. The tail blades are designed to ensure that the wind-turbines 201 are optimally exposed to the storm's winds. The supporting frame 204 may engage in a rotational movement around the central tower 202. Therefore, in conjunction with the tail blades 203, the supporting frames 204 facilitate the orientation of the wind-turbines 201 as necessary in order to capture the most amount of energy from the storm's winds. Alternatively, the supporting frames 204 may be rigidly attached to the central tower 202, with all the tail blades 203 aligned on one side of the central tower 202. Thus, all tail blades 203 will jointly act to rotate and position the wind-turbine pump tower in the wind's direction.

Figure 3:
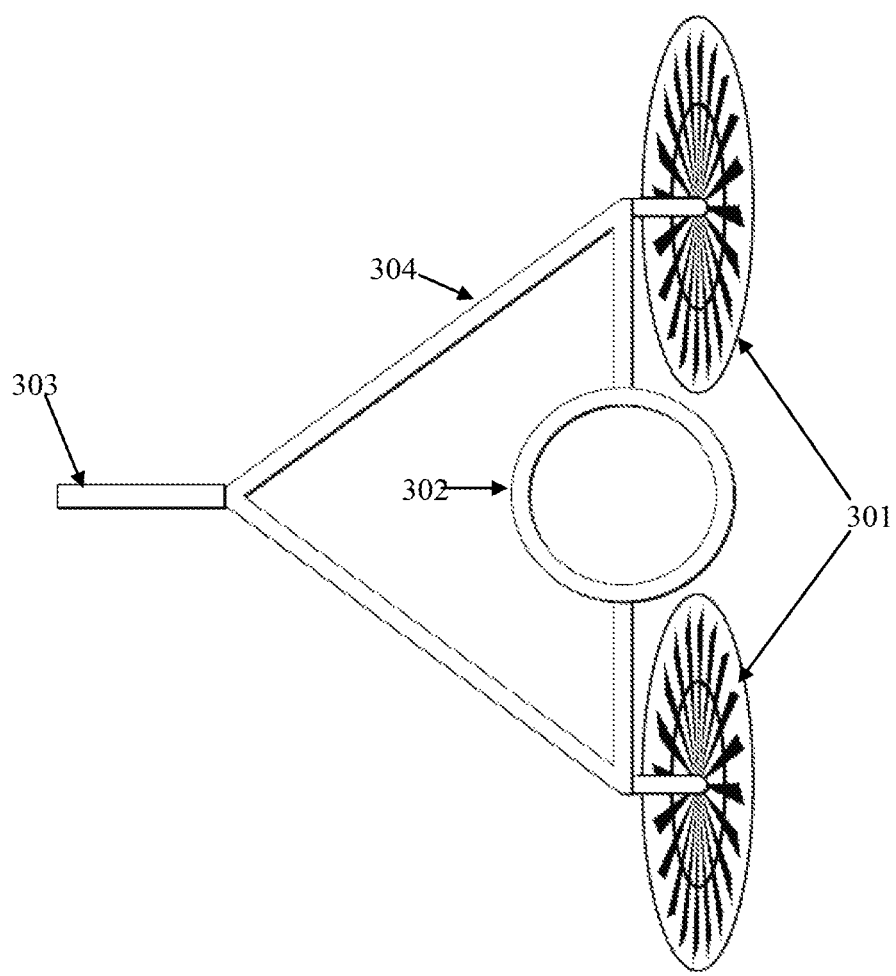
FIG. 3 illustrates a top view of a wind-turbine pump tower with paired wind-turbines 301, central tower 302, tail blade 303 and wind-turbine supporting frame 304, in accordance with several embodiments of the present invention.

FIG. 3 illustrates a top view of a wind-turbine pump tower with paired wind-turbines 301, hollow central tower 302, tail blade 303 and wind-turbine supporting frame 304, in accordance with several embodiments of the present invention. The tail blade 303 is designed to point into the wind at all times. The paired wind-turbines 301 are designed to have spin directions oriented for maximum stability (i.e. opposite to each other) and balance of the wind-turbine pump tower.

Figure 4A:
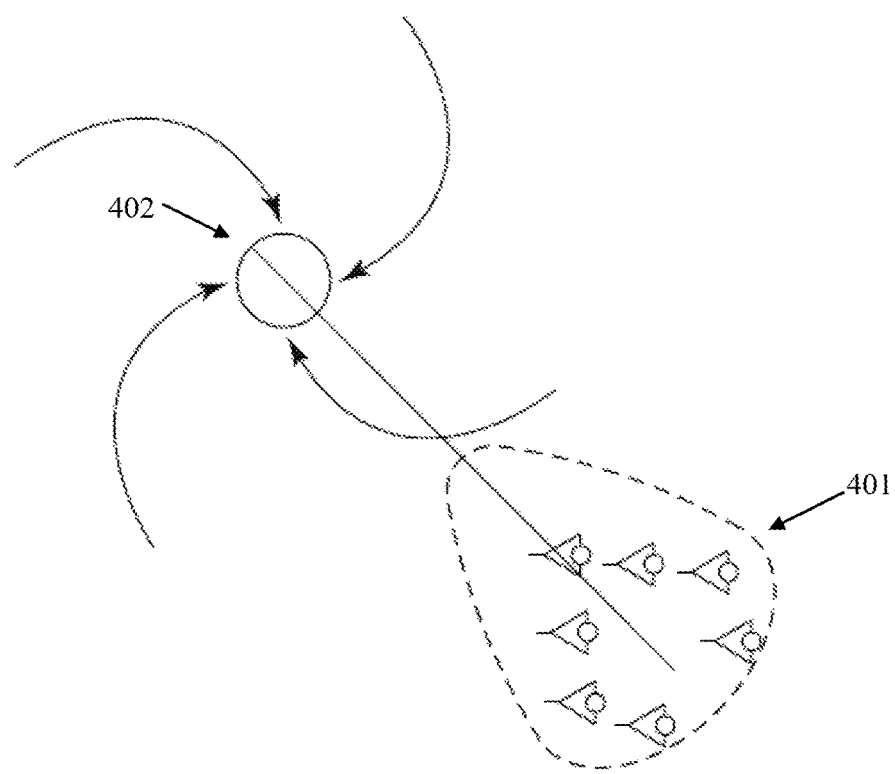
FIG. 4a and FIG. 4b represent diagrammatic views of a cluster of wind-turbine pump towers 401 and the cluster's relative position to the storm eye 402 at deployment (FIG. 4a) and after having been in operation for a time (FIG. 4b) in accordance with an embodiment of the present invention.
Figure 4B:
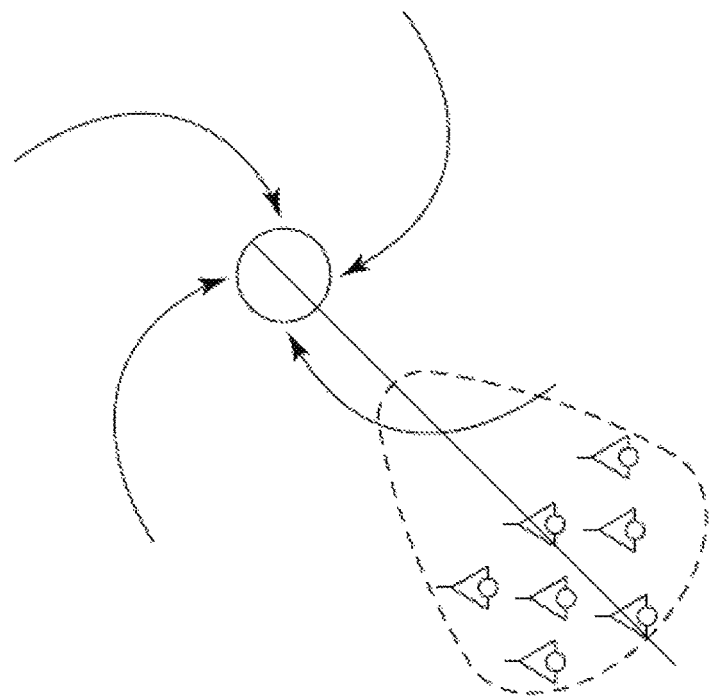
Figure 5:
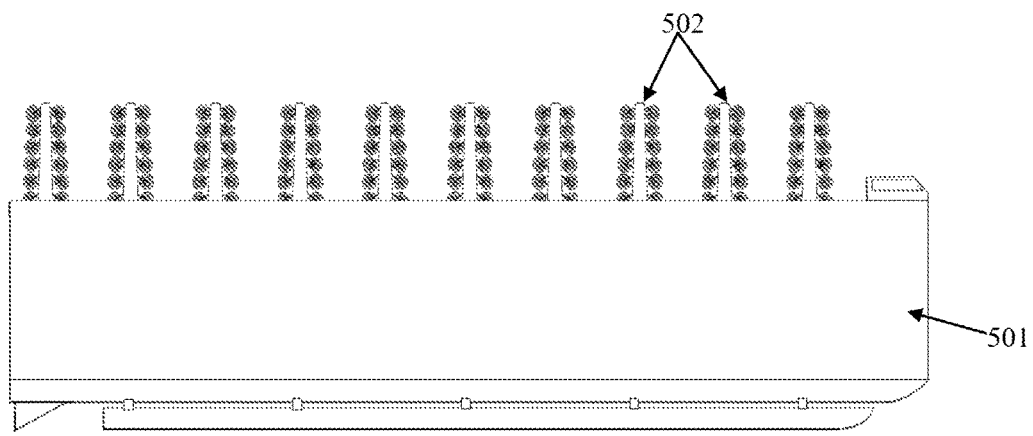
FIG. 5 illustrates a side view of a carrier ship 501 used to transport and deploy wind-turbine pump towers 502.
Figure 6:
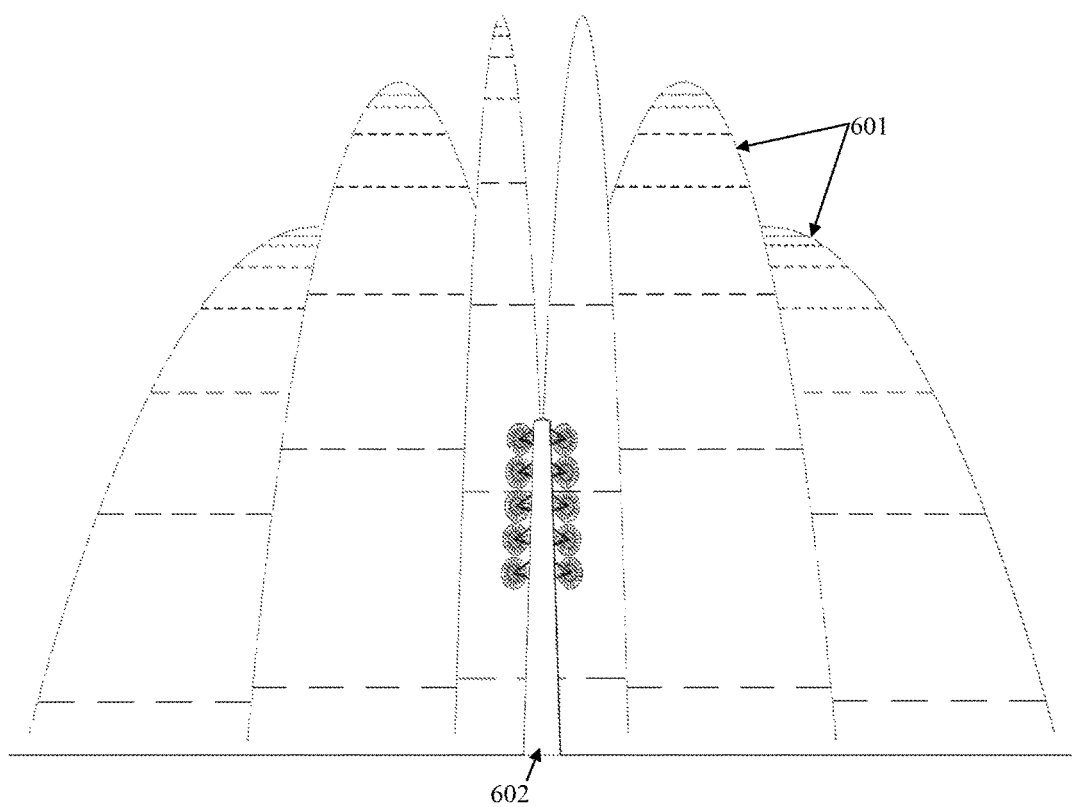
FIG. 6 is a diagram indicating the cross-sectional area 601 of spray provided by one wind-turbine pump tower 602 in accordance with several embodiments of the present invention.
Figure 7A:
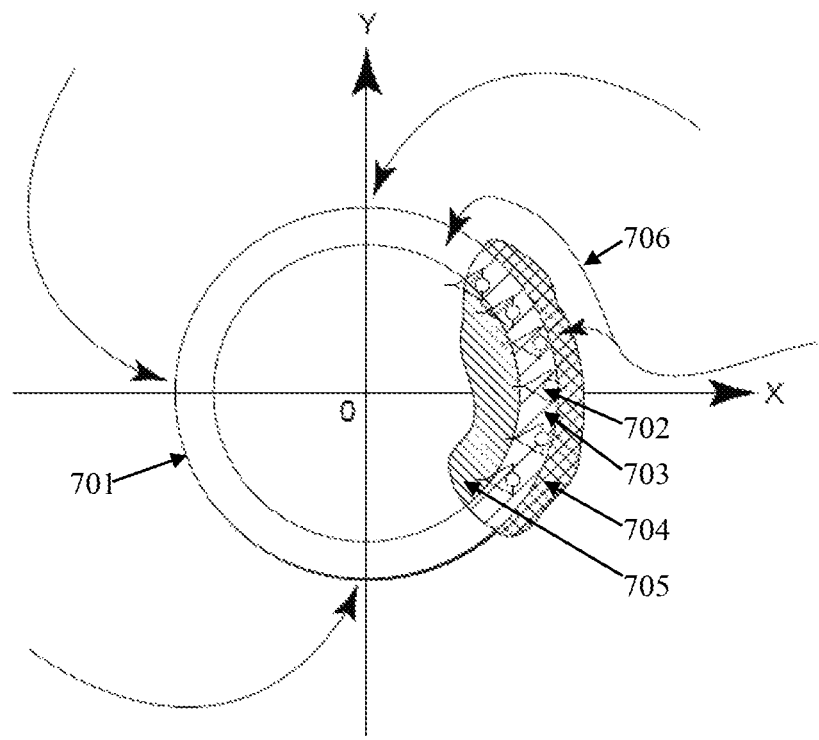
FIG. 7a and FIG. 7b show diagrammatic views of the effects of deploying on one side of the storm eye wall 701 of an array of wind-turbine pump towers 702, those effects being the creation of a wind barrier in area 703, a slightly higher pressure in area 704 and a slightly lower pressure in area 705, and consequently forcing the winds 706 coming from the direction of said side to go around the said array of pump towers, and ultimately causing the center of the storm to move toward the said side as illustrated in FIG. 7b, in accordance with an embodiment of the present invention.
Figure 7B:
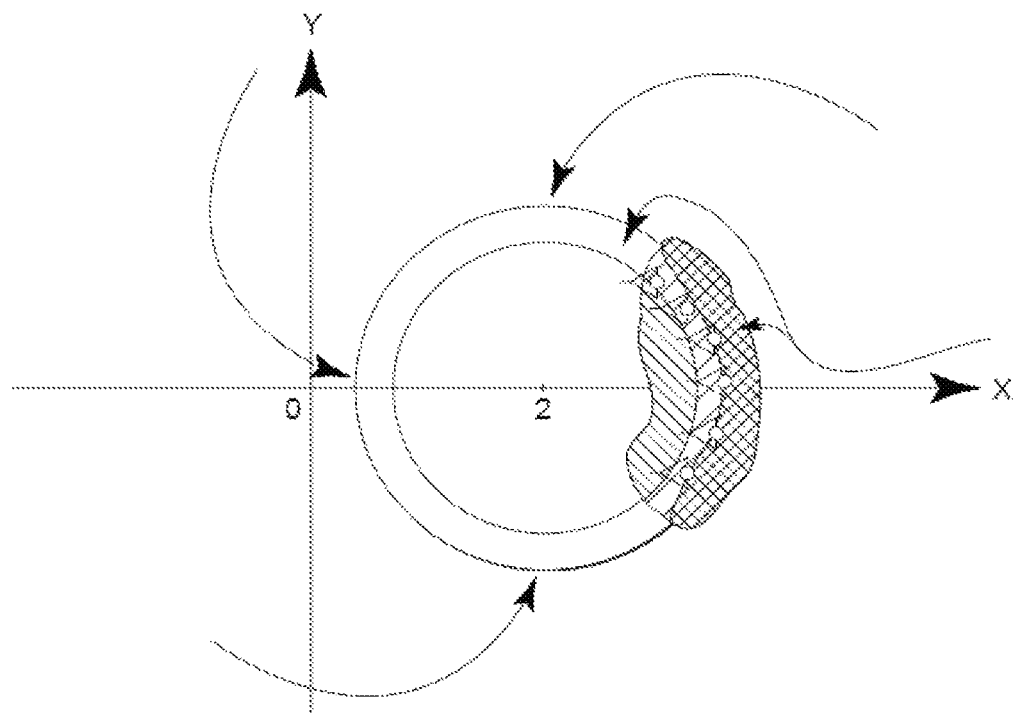
Figure 8A:
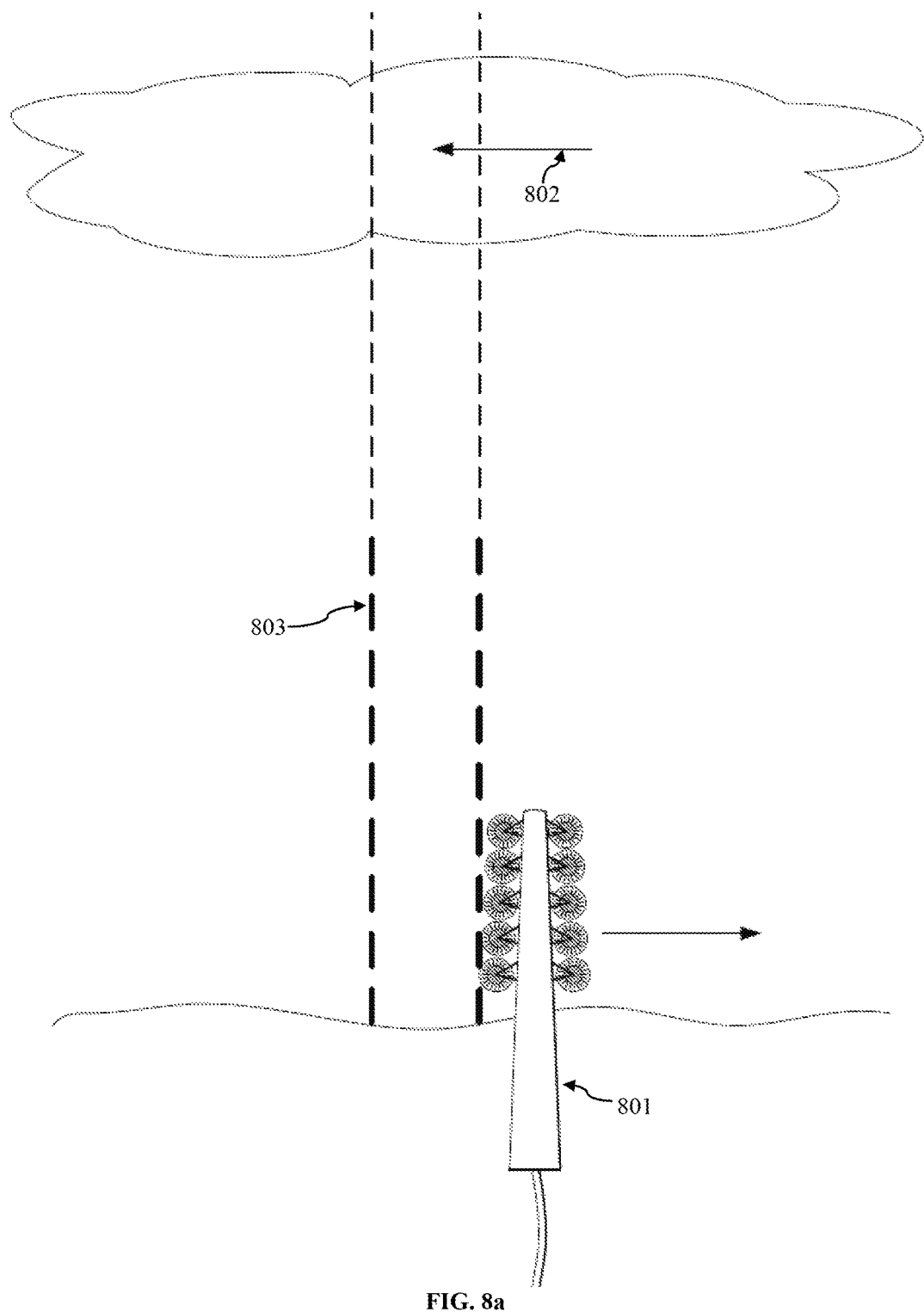
FIG. 8a and FIG. 8b represent cross-sectional views of a wind-turbine pump tower 801, driven against the side of the storm's eye-wall which is directionally opposite to known high-altitude winds 802, in order to apply sheer forces to the storm's eye column 803, the resultant sheer effect being illustrated in FIG. 8b, in accordance with an embodiment of the present invention.
Figure 8B:
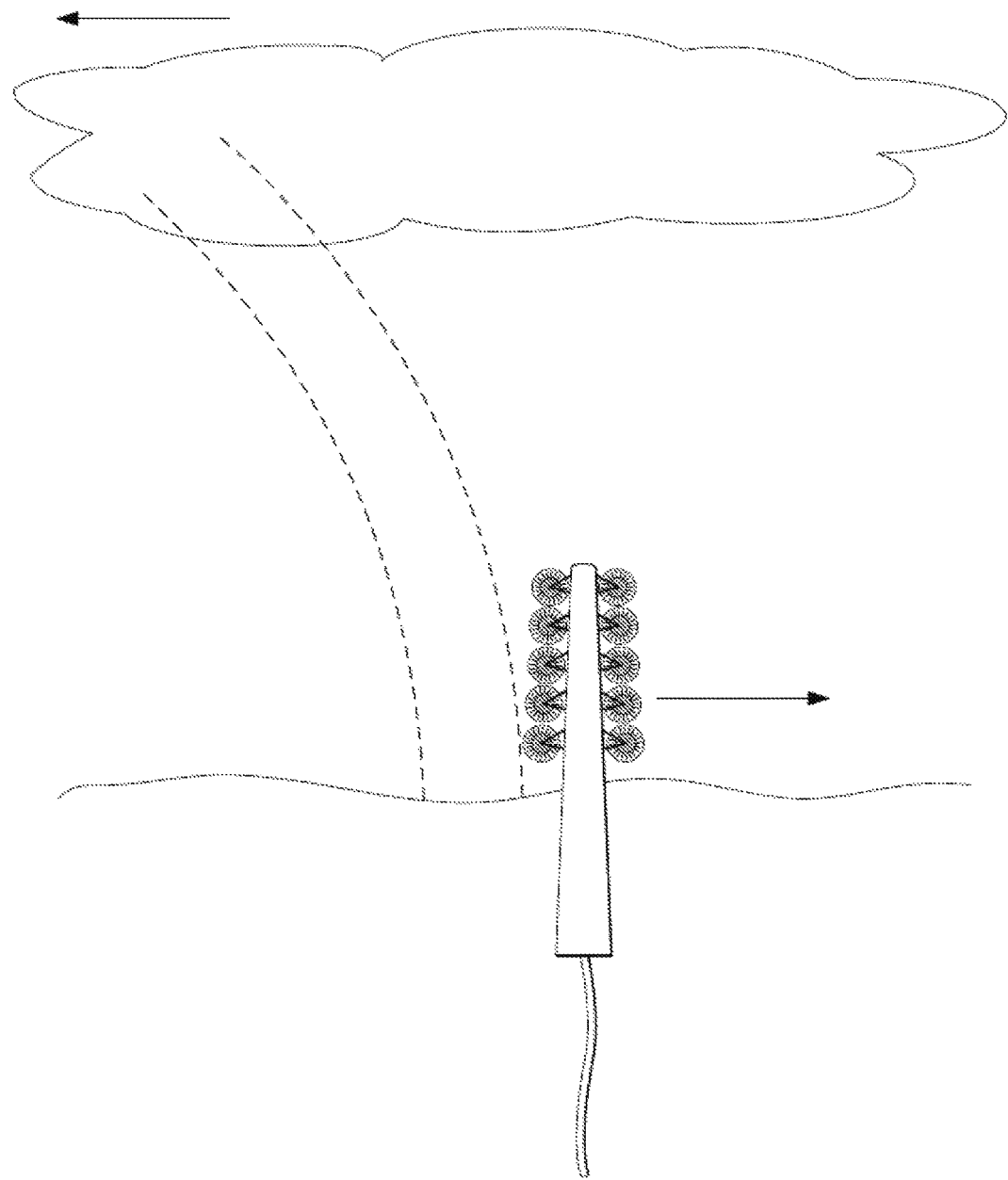

FIG. 4a and FIG. 4b represent diagrammatic views of a cluster of wind-turbine pump towers 401 and the cluster's relative position to the storm eye 402 at deployment (FIG. 4a) and after having been in operation for a time (FIG. 4b) in accordance with an embodiment of the present invention. This illustrates the tendency of the towers to draw the eye of the storm down upon themselves by virtue of the slowdown of the winds moving into the eye from that quarter. Conservation of momentum principles mean that the spray pumped into the air will slow down wind speeds and if the wind cannot get to the low pressure of the eye from that direction then the eye will tend to move towards that direction.

Positioning and keeping the wind-turbine pump towers in the reasonably high-speed wind area of the storm may be desirable since that would mean that more cold water is pumped into the air by the same number of wind-turbine pump towers and/or that less wind-turbine pump towers would be needed to achieve the same results, thus, increasing the efficiency of the operation. However, it may be preferred to deploy the wind-turbine pump towers in the predicted path of the storm. This is because trying to place the wind-turbine pump towers directly into high-speed wind areas from the carrier ship (e.g. storm's eye) is more dangerous. It is also important to note that the cluster of wind-turbine pump towers 401 makes it more likely that the storm will follow the predicted path. This is because, as illustrated in FIG. 4*b*, the eye of the storm may be drawn toward the cluster 401 due to the interruption of incoming winds created by the cluster itself as it pumps spray into the air.

Positioning the cluster of wind-turbine pump towers in a ring formation around the outside of the eye-wall may be desirable for storm dissipation purposes as this keeps the towers in strong wind areas and will tend to anchor the storm in place. However, the formation of the cluster of wind-turbine pump towers may be changed as deemed appropriate. The ultimate goal is to pump into the air as much cold water as possible in the most efficient way possible.

FIG. 5 illustrates a side view of a carrier ship 501 used to transport and deploy wind-turbine pump towers 502. To effect rapid deployment and insertion of wind-turbine pump towers 502 into the developing eyes of tropical systems, fast customized carrier ships 501 may be built. These ships may be designed to carry a plurality of wind-turbine pump towers 502, as for example 10 or 20 at a time, for deployment into a storm's path or eye. The carrier ships 501 may use an efficient catamaran hull (possibly even with hydrofoil technology) for rapid transit across the world's oceans and an aerodynamic design for minimized resistance to storm waves and winds.

FIG. 6 is a diagram representing the cross-sectional area 601 of spray provided by one wind-turbine pump tower 602 in accordance with several embodiments of the present invention. Using general engineering pumping equations, the most economical combination of tower 602 height and pumping power as relates to cross-sectional area 601 of spray coverage achieved (applying projectile motion equations in the three spatial dimensions) must be arrived at. The objective of this is to minimize the droplet size of the spray and maximize the time the spray is in the air in order to ensure the fastest and most efficient transfer of heat energy from the warm storm winds to the cold spray.

FIG. 7*a* and FIG. 7*b* show diagrammatic views of the effects of deploying on one side of the storm eye wall 701 of an array of wind-turbine pump towers 702, those effects being the creation of a wind barrier in area 703, a high pressure area 704 and a low pressure area 705, and consequently forcing the winds 706 coming from the direction of said side to go around the said array of pump towers, and ultimately causing the center of the storm to move toward the said side as illustrated in FIG. 7*b*, in accordance with an embodiment of the present invention. The wind-turbine pump towers 702 driven against the eye wall 701, slow wind speeds behind them through the action of the pumped spray. If winds in zone 703 have been slowed down and cannot move into the main low pressure of the eye quickly then there is effectively another lower pressure being created in this zone. If winds from one side of the eye wall cannot move into the center, then the center will tend to move towards that eye wall to prevent a vacuum (air will rush in through the path of least resistance i.e. the directions from which its movement is unimpeded by pumped spray).

FIG. 8*a* and FIG. 8*b* show diagrammatic views of a wind-turbine pump tower 801 placed on the side of the storm's eye which is directionally opposite to known high-altitude winds 802 in order to apply shear forces to the storm column 803, the effect being illustrated in FIG. 8*b*, in accordance with an embodiment of the present invention. As described earlier, positioning of array of wind-turbine pump towers on one side of the storm eye wall may cause the center of the storm to move toward the said side. Therefore, progressively maneuvering the wind-turbine pump towers away from the initial center of the storm may cause the "pulling" of the base of the storm column 803 in that direction. If that direction is chosen to be opposite to a known high-altitude wind 802, the effect may be the shearing of the storm column 803, hence the dissipation of the storm.

The dissipation of the storm, by shearing it, may be achieved through the aggressive steering/pulling of the base of the storm, in conjunction with increasing the intensity of the storm, by misting warmer surface water, and hence potentially, "growing" the storm taller to take advantage of opposing high altitude global winds. The latter technique may be the only option when the storm is already close to shore, and therefore, cold deeper water is not available. However, caution must be exercised with this facet of the invention since increasing the intensity of a storm close to shore without achieving dissipation defeats the purpose of the invention.

Again, in order to achieve dissipation of a hurricane the spray pumped into the air would be drawn from the deep cold waters below the storm. In addition, misting of the spray into smaller droplets maximizes the surface area to volume ratio of the water and accelerates heat energy transfer between warm air and cold spray. The end result is that the concentration of heat energy which is the driving force of any hurricane is dissipated and absorbed by the cold water misted and/or sprayed up by the pumps which are driven by the power of the storm's own winds. In addition, conservation of momentum principles mean that this water dispersed as spray into the air will also act as a massive brake on wind speed, thus also contributing to the decrease in wind speeds.

Studies show that as a hurricane intensifies, the eye size tends to contract down to between 5 and 15 miles. The average eye size for tropical events is said to be about 30 miles across. A spread of floating wind turbines that can introduce significant spray into the air such as to affect wind speeds over such an eye size range is a very feasible undertaking.

There may also be a destabilizing effect caused by the sprayed cold water in terms of causing a disruption of the symmetry of the cyclonic storm. This loss of cyclonic/circular shape may also be contributory to storm dissipation.

This system for hurricane dissipation involves a quantification calculation which considers the energy present in the storm (kinetic and heat) and the ground speed (speed of the eye over the surface of the ocean) of the storm. Based on this energy (which includes such elements as kinetic energy {wind speeds} and potential energy {heat energy or temperature}) a calculation of the volume of cold water that would be required (at each given degree of temperature) to lower the energy in the hurricane to the point of dissipation may be calculated. Based on this calculated volume of water required and knowing the pumping volume rates of a given pumping unit, the number of pumping units required to effect storm dissipation based upon the storms ground speed and time/location window for dissipation may be calculated.

Again, in the unlikely event that cold water is not available, warmer surface water may be misted to increase storm intensity thus growing the eye wall taller. Initially, conservation of momentum might mean wind speeds would slow but the heat energy injection into the system will result in intensification. If there are strong low atmospheric and high atmospheric winds blowing in opposing directions at the top and bottom of the hurricane eye wall a shearing effect may occur. If the vertical eye column shears, then the hurricane may be dissipated. This technique may be used but only as a last resort and never in preference to the cold water technique, except in training exercises. This is because, again, increasing the intensity of a hurricane close to shore in shallow waters, which is where there might be a lack of cold deep water, is risky business if the storm doesn't shear and dissipate.

As earlier described, the drive of the invention is to have the ability to dissipate storms at will and to have the power to prevent landfall of hurricanes and tropical storms through their dissipation, by using cold water to draw the heat energy out of the storm. Pumps that are dropped in the path of the storm and quickly bring the deeper cold water up and simply spill it over the ocean surface are another embodiment of this invention. The storm winds and associated waves do create spray which naturally helps increase surface area to volume ratios for heat transfer.

Cold water picked up and dropped from airplanes will also achieve the effect of introducing and mixing the cool water with the storm's heated air. It will also cause the slowdown of storm winds due to conservation of momentum principles as the wind picks up and carries the heavy spray.

Another alternative embodiment may be to draw colder deeper water up from next to the storm and fill the hold of a ship with it, then drive the ship into the storm and spray/mist/mix the water into the air from the ship. The ship could, in addition, continue to pump water up from below and spray it into the air whilst it was in the storm itself acting in the same way as one of the wind turbine towers previously described.

A submarine may also be used as the platform from which to move the colder, deeper water to the surface where the storm's natural spray will provide for some heat transfer, or a pumping tower structure may be used to enhance to greatest effect the spraying and misting which provide the increased surface area to volume ratio needed for most effective heat transfer.

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. A storm dissipation system comprising: means for upwardly propelling water into the air, the means for upwardly propelling water into the air having a cluster of floating pump towers, each one of the floating pump towers having an upper end extending into the air above a body of water, and a lower end having a weighted hose, the lower end being submerged into the body of water, and a hollow interior for housing at least a generator and at least a water pump in a vertical alignment with the at least a generator, the at least a water pump being configured to draw the water from the body of water through the weighted hose of the lower end and upwardly propel the water out of the upper end of the floating pump tower into the air, wherein the pump towers' height above the body of water is selected to increase a time for mixing of the water with the air for the purpose of changing energy of the storm, the body of water being located in proximity of said storm, said water being upwardly propelled above the upper end without restriction to any intentionally imposed height limit other than any height limit imposed by technology used, and away from a surface of the body of water, and means for mixing said water with the air for the purpose of changing the energy of said storm, such that a first time the water needs to ascend through the air plus a second time the water needs to descend through the air under the influence of gravity into said body of water is maximized for energy transfer between the water and the air.

2. The system of claim 1, wherein said water is cold water.

3. The system of claim 1, wherein said body of water is located under said storm.

4. The system of claim 1, wherein said propelling is at least one member of the group consisting of spraying, misting, micro-misting, pumping, injecting and jetting.

5. The system of claim 1, wherein said mixing is achieved by quickly bringing deeper cold water to the surface of said body of water.

6. The system of claim 1, wherein said means for moving and said means for mixing are powered using at least one member of the group consisting of said storm's own winds, fossil fuel, nuclear power, fuel cell, solar power, wave motion and battery power.

7. The system of claim 1, wherein said mixing occurs inside the storm's eye wall.

8. The system of claim 1, wherein said mixing occurs outside the storm's eye wall.

9. The system of claim 1, wherein said system is self-propelled.

10. A storm dissipation system configured to change energy of a storm within a body of water by mixing water from the body of water with air above the body of water, the system comprising:

a plurality of floating pump towers arranged in a cluster, each tower of the plurality of floating pump towers having:
  a plurality of wind turbines;
  a central tower having an upper end, a lower end, and a hollow interior for housing at least a generator and at least a water pump in a vertical alignment with the at least a generator;
  a water-filled base having baffles at the lower end configured to stabilize the central tower in an upright position in the body of water;
  a wind turbine supporting frame associating each wind turbine of the plurality of wind turbines with the central tower;
  a plurality of tail blades, each tail blade of the plurality of tail blades extending from each wind turbine of the plurality of wind turbines;
wherein the upper end extends into the air above the body of water;
wherein the lower end is submerged into the body of water, and the lower end comprises a weighted hose; and
wherein the at least a water pump is configured to draw the water from the body of water through the weighted hose and upwardly propel the water out of the upper end into the air;
wherein the wind turbine supporting frame is configured to engage in a rotational movement around the central tower when the plurality of tail blades is exposed to wind from the storm; and
wherein a height of each tower of the plurality of floating pump towers above the body of water is selected to increase a time for mixing of the water with the air for the purpose of changing the energy of the storm;
and wherein the water is upwardly propelled above the upper end away from the body of water without restriction to any intentionally imposed height limit other than any height limit imposed by technology used;
such that a first time the water needs to ascend through the air plus a second time the water needs to descend through the air under the influence of gravity into the body of water is maximized for energy transfer between the water and the air.

* * * * *